United States Patent [19]
Wagner

[11] Patent Number: 6,009,741
[45] Date of Patent: Jan. 4, 2000

[54] METHOD OF PREDICTING STEADY INCOMPRESSIBLE FLUID FLOW

[75] Inventor: Craig A. Wagner, Norwich, Conn.

[73] Assignee: The United States of America as represented by the Secretary of the Navy, Washington, D.C.

[21] Appl. No.: 07/623,324

[22] Filed: Dec. 5, 1990

[51] Int. Cl.[7] .................................................. G01F 1/34
[52] U.S. Cl. ............................................................ 73/1.57
[58] Field of Search .................................... 364/509, 510; 73/1.57, 147, 861.42

[56] References Cited

U.S. PATENT DOCUMENTS 4,802,144  1/1989  Holzhausen et al. ...................... 367/35
4,920,808  5/1990  Sommer ................................. 73/861.42

*Primary Examiner*—Moustafa M. Meky
*Attorney, Agent, or Firm*—Michael J. McGowan; Prithvi C. Lall; Michael F. Oglo

[57] ABSTRACT

A method of predicting steady, incompressible fluid flow over a given geometry is provided. The given geometry is modeled with a plurality of overlapping blocks. Pseudocompressibility equations are solved in an iterative process according to a finite differencing method. The solutions at each overlapped portion are used to update solutions of adjoining blocks. By linking the blocks through overlapping, the solution converges at a faster rate than if each block were solved for independently.

3 Claims, 2 Drawing Sheets

METHOD OF PREDICTING STEADY INCOMPRESSIBLE FLUID FLOW

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to steady, incompressible fluid flow and more particularly to a method for predicting steady, incompressible fluid flow over a large-scale flow field.

(2) Description of the Prior Art

The prediction of a steady, incompressible fluid flow over a large-scale flow field is an invaluable design tool. A well-known method of achieving such prediction is the solving of the Navier Stokes equations, shown below:

$$\nabla \cdot V = 0 \qquad (1)$$

$$\frac{DV}{Dt} = -\frac{1}{\rho}\nabla P + \nu \nabla^2 V \qquad (2)$$

where $V=V(u,v,w)$ is the vector velocity field containing the x, y, and z component of velocity, P is the fluid pressure, $\nu$ is the kinematic fluid viscosity, and p is the constant fluid density. $\nabla$ indicates the divergence or gradient of a vector of scaler field respectively, and $\nabla^2$ indicates the vector Laplacian. The D/Dt expression is the symbol for the substantial derivative and the symbol "t" represents time.

The above-shown two equations represent the expressions for conservation of fluid mass and conservation of fluid momentum for an incompressible fluid, respectively. An incompressible fluid is defined here as a fluid which has constant density everywhere in the domain in question.

Unfortunately, in their proper form, the complexity of these equations makes them analytically and numerically unsolvable for large and/or complicated geometric configurations.

In order to overcome this problem, a method called pseudocompressibility was introduced by A. J. Chorin in "A Numerical Method for Solving Incompressible Viscous Flow Problems", J. Comp. Physics, Vol. 2, pp. 12–16, 1967, to alter the incompressible equations shown above to the form shown in equations (3) and (4) below:

$$\frac{\partial P}{\partial t} = \beta \nabla \cdot V \qquad (3)$$

$$\frac{DV}{Dt} = -\frac{1}{\rho}\nabla P + \upsilon \nabla^2 V \qquad (4)$$

The difference between equations (1) and (2) and (3) and (4) can be seen as the addition of the $\partial \rho/\partial t$ term in the conservation of fluid mass equation. This term is used to change the mathematical representation of the fluid equations, such that they can be solved easier and more directly. However, by adding the pressure time derivative term, the fluid behavior that these equations describe has been changed. In equations (1) and (2) the "t" symbol represents true physical time. In equation (3) and (4) "t" no longer represents time; it is only a mathematical iteration parameter used to allow the more straight forward solution method. A solution to equations (3) and (4) will provide only steady incompressible flow fields. If the original equations (1) and (2) were solved, unsteady flow fields could also be predicted. Therefore in the following technique described, the resulting flow fields predicted by the method discussed will be solutions for steady incompressible flow fields only. The equations (1) and (2) are known as the incompressible Navier Stokes equations.

Currently, the pseudocompressibility equations are solved for a plurality of points or nodes describing the flow area under consideration. The geometric flow area of concern must first be modeled, as discrete mathematical pieces. These mathematical pieces are the actual sections over which the governing equations are solved. Three very popular methods include the finite element approach, finite volume approach and the finite difference method. In order to better understand the prior art, a brief description is provided of the finite difference method used to solve the pseudocompressibility equations. The finite difference method involves describing the flow area with many small points, called grid points, mesh points, or nodes. FIG. 1(a) shows an example of a two-dimensional fluid flow problem and FIG. 1(b) shows a representative finite difference mesh which might be constructed for this particular problem.

In FIG. 1(a), a two-dimensional flow, indicated by arrow 10, enters a flow area 11 between two walls 13 and 15, respectively, and exits as flow 20. The change in the structure of the flow field as it passes through area 11 is the issue of concern. FIG. 1(b) shows the flow area 11 modeled as a plurality of nodes 17 that define the geometry of flow area 11. It is to be noted that nodes 17 are chosen closer together over areas of changing geometry, i.e., changing flow. It should also be noted that the mesh shown here may not be a good finite difference mesh in actuality, but it is used to illustrate the following discussion.

At all the nodes 17 which fill the flow area 11, the governing pseudocompressibility equations must be solved. The pseudocompressibility equations must be solved at each node 17 for pressure and a three-dimensional velocity vector in order to describe the flow at node 17. For example, if it takes 1,000 points to adequately describe a given geometry, then there are a total of 4,000 equations which must be solved since it takes 4 equations at each node to describe the fluid. The boundary points are chosen such that they accurately describe the physical boundaries of the flow area 11 of interest as well as the important features of the flow field in area 11.

Since the pseudocompressibility equations are not the exact incompressible equations describing the fluid behavior, (i.e., they are only a mathematical contrivance), the solution actually involves an iterative scheme. In other words, solving the equations once for all nodes 17 is insufficient to obtain the final answer. The process begins with an initial estimate of the pressure, and three velocity values at every node 17. The initial estimate of the flow in area 11 is used in the pseudocompressibility equations, and solving the equations then predicts the next best solution to the flow field problem. This initial prediction will not generally satisfy the incompressible Navier Stokes equations. Accordingly, the newly predicted values for the pressures and velocities are then used as the new estimate of the fluid flow in area 11. This new estimate is used in the pseudocompressibility equations and a new flow field is again predicted. This iterative process continues until the solution satisfies the Navier Stokes equations within a desired tolerance. This iteration procedure can take any-where from several hundred to several thousand cycles through all the equations for all the nodes 17.

Large-scale flow areas further complicate the analysis since the number of nodes required to accurately describe the flow area of concern may number well into the millions. At this point, computer memory limitations require that the flow area be divided into a plurality of blocks. This is a well-known technique in the art and is referred to as multi-blocking.

Multiblocking allows the computer to take a large intractable flow field domain, which has been represented by finite difference nodes, and break it up into smaller, manageable regions which can be solved individually. Since computers today have limited amounts of memory that restrict the size problem that can be solved at one time, the multiblocking process provides a way around this. However, breaking up the larger domain into smaller multiblock domains creates artificial internal boundaries in the finite difference mesh. These artificial boundaries occur at multiblock boundaries which occur arbitrarily within the domain and not at the true boundaries of the physical problem. While the breakup into multiblock domains enables the computers to solve the smaller system, the artificial boundaries can affect the accuracy of the final solution as well as significantly increase the number of numerical iterations it takes to obtain the final flow field prediction. This occurs because the Navier Stokes equations cannot be directly solved on the artificial multiblock boundaries. These boundaries really require boundary conditions much the same as the true physical boundaries require specification of boundary conditions. Therefore, the method for treating the artificial multiblock boundaries is the key to obtaining accurate steady, incompressible flow field predictions with a minimal amount of numerical iterations.

SUMMARY OF THE INVENTION

Accordingly, it is an object of the present invention to provide a method of predicting steady, incompressible fluid flow of over a large-scale flow area that reduces the processing time required by current methods.

Another object of the present invention is to provide a method of predicting steady, incompressible fluid flow over a large-scale flow area that uses multiblocking to solve the pseudocompressibility equations.

Other objects and advantages of the present invention will become more obvious hereinafter in the specification and drawings.

In accordance with the present invention, a method is provided for predicting steady, incompressible fluid flow over a given geometry. An overlapping multiblock grid model is created to define the given geometry. Each block of the model is defined by boundary nodes and contains interior nodes. In the overlapping portions, boundary nodes from one block overlap to the interior nodes of an adjoining block. Thus, a boundary node for one block is an interior node of an adjoining block. The pseudocompressibility equations are solved, through iterative processing, for each block at both boundary and interior nodes according to the finite difference method. The values of the boundary nodes of one block are solved for using the boundary and interior nodes of the overlapped adjoining block. At each iteration, the difference in the solved equations between a node serving as a boundary node of one block and as an interior node of an adjoining block is used by the pseudocompressibility equations in the next iteration. In this way, the solution of the individual blocks are coupled by the overlapping node structure.

DESCRIPTION OF THE PREFERRED EMBODIMENTS

As mentioned above, the multiblock technique involves two processes. The first involves the generation of a grid model consisting of a plurality of nodes defining a given geometry and the second is the dividing of the grid into computer manageable blocks. The method of the present invention assumes that a grid model is provided. Indeed, several grid generation software tools exist which perform this task. One such tool is the EAGLE program developed by Professor Joseph Thompson in "A Composite Grid Generation Code for General 3-dimensional Regions—The EAGLE Code", AIAA J., Vol. 26, No. 3, p. 271, March 1988, and is herein incorporated by reference for illustration.

Figure 1A:
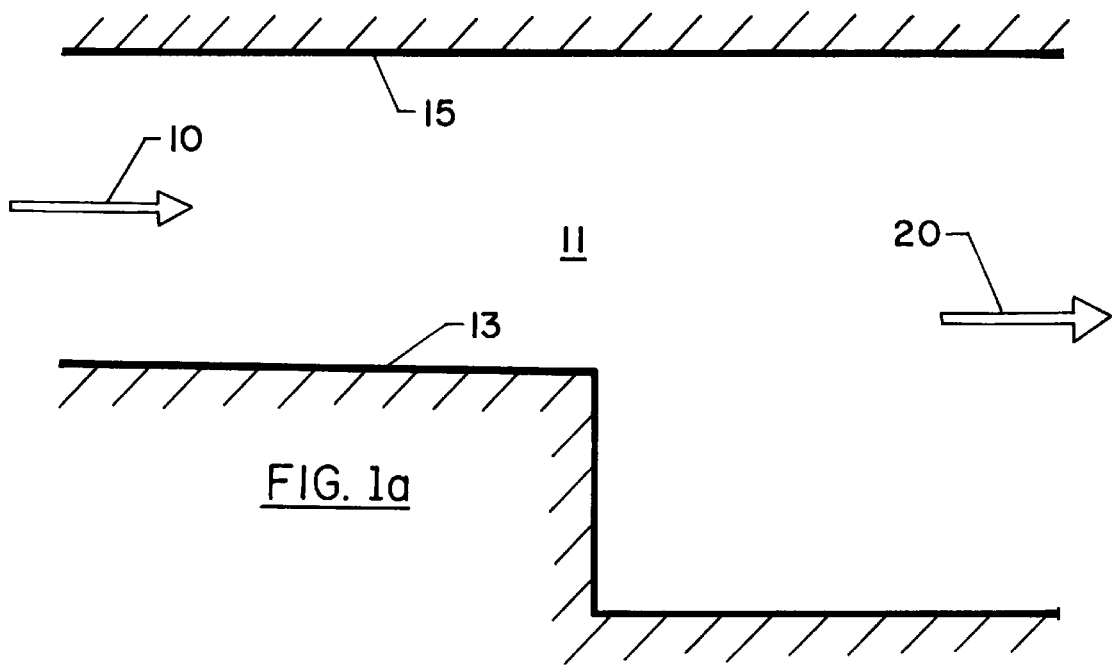
FIG. 1(a) is a two-dimensional flow area.
Figure 1B:
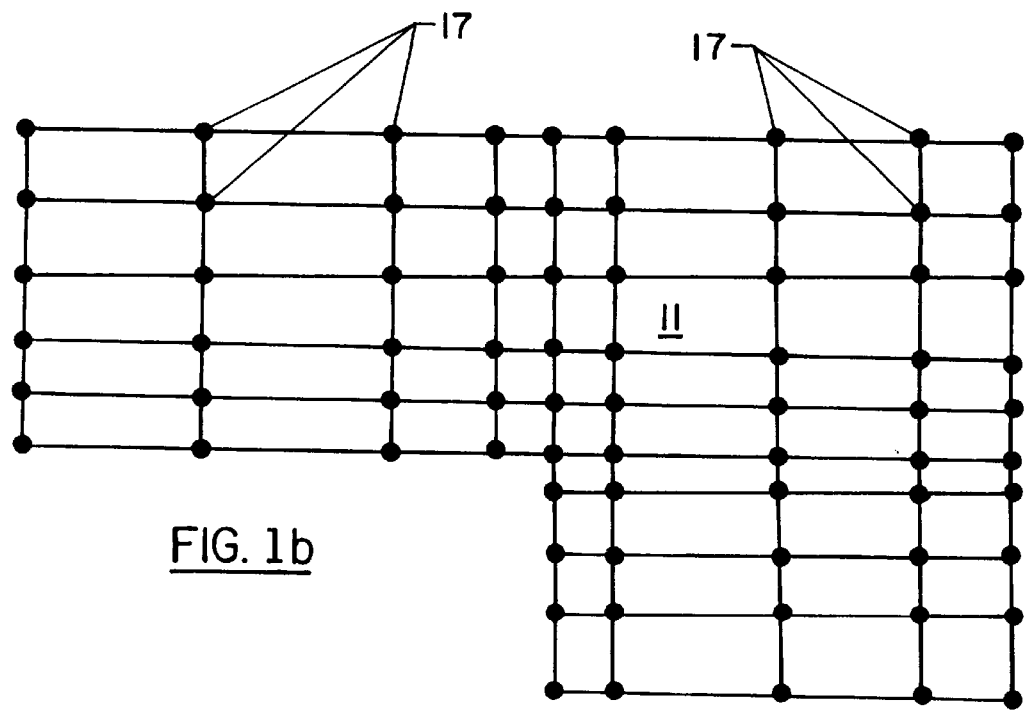
FIG. 1(b) is a the two-dimensional flow area of FIG. 1 modeled as a plurality of nodes.
Figure 2:
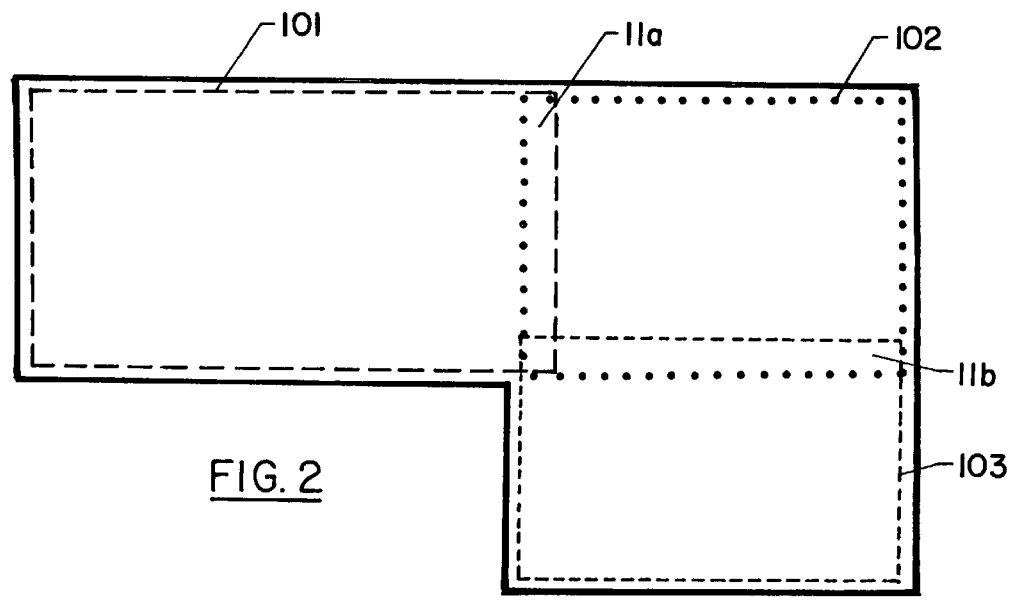
FIG. 2 is a two-dimensional flow area of FIG. 1(a) divided into three overlapping blocks according to the method of the present invention.

Referring now to the drawings, and in particular to FIG. 2, the flow area 11 of FIG. 1(a) is shown divided into three blocks 101, 102 and 103. Block 101 is enclosed by the long dashed lines, block 102 is enclosed by a series of small circles and block 103 is enclosed by the short dashed lines. For sake of simplicity, the method of the present invention will be described for this simple geometry. However, as will be apparent, the method applies regardless of the size of the grid model or number of blocks required.

Blocks 101, 102 and 103 are chosen to form an overlap at each adjoining block. Blocks 101 and 102 overlap at a portion 11a of flow area 11. Blocks 102 and 103 overlap at a portion of 11b of flow area 11. It is the creation of this overlap that aids in decreasing the solution time required to solve the pseudocompressibility equations.

Figure 3:
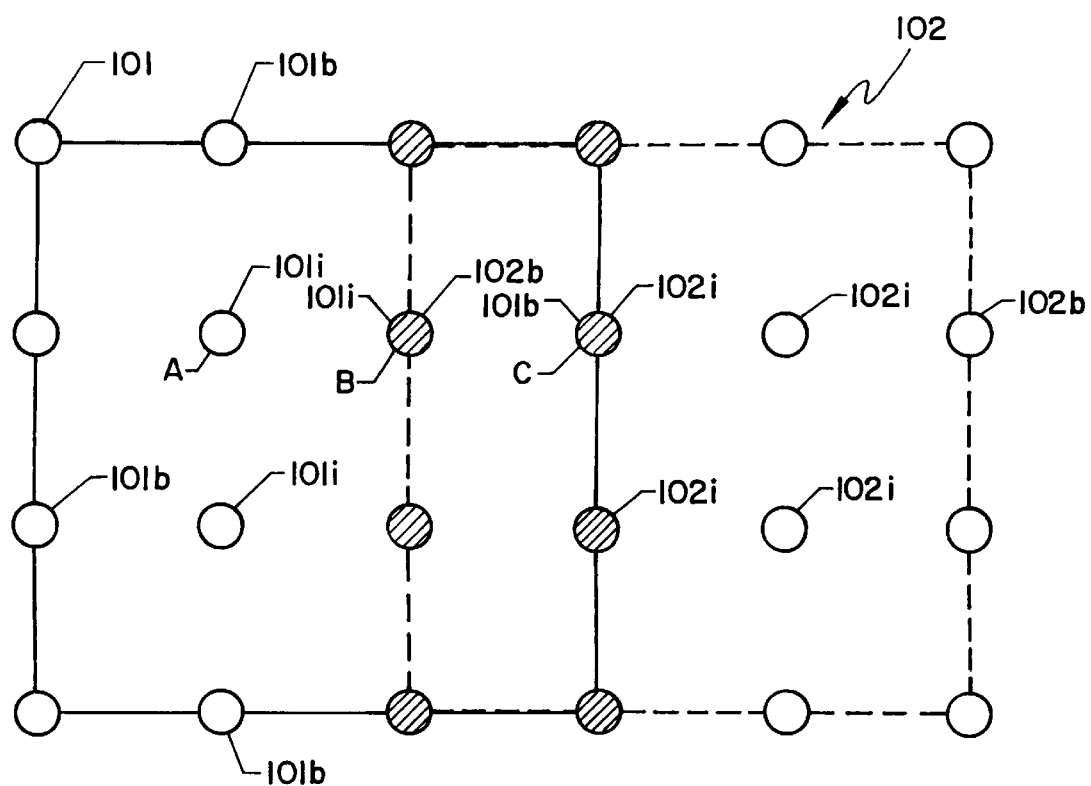
FIG. 3 shows the relationship between two adjoining blocks from FIG. 2 at the nodal level.

In order to better understand the multiblock overlap or linkage, FIG. 3 shows the relationship between blocks 101 and 102 at the nodal level. Once again, the method of the present invention will be described only for blocks 101 and 102 for sake of simplicity. The method is repeated for all the other blocks in the given geometry. It should be noted that the finite difference mesh shown is used only for illustrative purposes and may not be the proper mesh for the flow problem under consideration.

Block 101 is defined by a plurality of boundary nodes 101b connected by solid black lines. Block 101 also contains a plurality of interior nodes 101i. Block 102 is defined by a plurality of boundary nodes 102b connected by dotted lines. Block 102 also contains a plurality of interior nodes 102i. As is readily apparent, some boundary nodes 101b are also the interior nodes 102i. Similarly, some boundary nodes 102b are also nodes 101i. An overlapping node is indicated in FIG. 3 by cross-hatching. These overlapping regions are the artificial multi-block boundaries previously discussed.

This overlapping is a key in maintaining solution continuity over the entire grid model including across block boundaries. Continuity is important because multiblock boundaries are not physical boundaries. They are numerical contrivances, and as such, must not affect the final solution desired. By overlapping the nodes, the governing pseudocompressibility equations at the block boundaries can be treated and solved in similar fashion as done at internal block nodes. However, values of pressures and velocities at the multiblock boundary nodes will lag the adjoining block values by one iteration. An example will demonstrate this technique and for ease of description will refer to nodes A, B and C. Node A is an interior node of block 101. Node B is an interior node of block 101 and a boundary node for block 102. Node C is a boundary node of block 101 and an interior node of block 102.

If the solution procedure starts in block 101, it first needs to apply boundary conditions and compute the governing equations at each boundary and interior node 101b and 111i, respectively. In order to solve the governing equations consistently throughout the entire grid model, a central differencing method is used. Basically, this requires that a node have neighboring nodes to the left, right, above and below it, except at boundaries that are true physical boundaries of the given geometry. One can see in block 101 that node A and B in FIG. 3 are interior nodes 101i and have nodes surrounding them which are also contained in block 101. However, note that node C is a boundary node 101b of block 101 and does not have a node to the right that is contained in block 101. However, it should be noted that node C does have surrounding nodes on all sides when the solution is iterating in block 102. Therefore, although the governing equations are not satisfied at node C during an iteration in block 101, the finite differencing method may be applied to node C when iterating in block 102.

The next step in the method of the present invention is to couple the solution at node C between iterations in block 101 and 102. The object of course is to minimize the number of iterations required to achieve the final solution. The coupling portion of the method will now be explained by continued reference to the example of FIG. 3 for two iterations of the solution process:

1) First all boundary and internal nodes in all blocks are given some value of pressure and the velocity which constitutes the initial guess or initial flow fields. Most likely these values will not satisfy equations (1) and (2) and iteration must be done to correct the flow field. This is done by starting in block 101. The equations for all internal nodes and the boundary conditions for all physical boundary nodes are assembled. Since node C does not have sufficient surrounding nodes in block 101 to use in the finite difference description of the psuedocompressibility equations, pressures and values at node C are not updated during the iteration in block 101. They are left for the moment at the original values, while all other nodes are updated.

2) The next step is to update the solution in block 102. Now node C does have sufficient surrounding nodes as do all other interior nodes in block 102. Note now that node B does not have nodes surrounding it on all sides that are contained in block 102, although it did in block 101. The procedure here is to first compute the difference between the new value of pressures and velocities at node B in block 101 and the values that node B has currently in block 102. This difference is then used in the solution procedure and will result in node B in block 102 being adjusted to have the same values as predicted in the first iteration in block 101. This computed difference is also coupled to the other internal and boundary nodes in block 102 through the solution procedure. Basically, the finite difference representation of the equations being solved results in a linear algebra or matrix problem. A large matrix is generated which couples the equations at all nodes, as well as the physical boundary conditions. However, there is no real boundary condition to apply, nor can the equations be formulated at these artificial multiblock boundaries.

Therefore, the technique used here is to take the change in the node B pressures and velocities predicted by the solution in block 101, where the fluid equations could be applied to node B, and insert that change for the node B values directly in the matrix describing the coupling between the equations and boundary conditions in block 102. By doing this, we have allowed node B to appear to all the other nodes in block 102 as though it is an internal node with surrounding nodes on all sides. Essentially this removes the artificial multiblock boundary for the first iteration in block 102. Note that this description applies to the treatment of all the other artificial multiblock boundary nodes contained in block 102 during the update procedure.

3) Once all the blocks have been updated for the first iteration, a check is made for solution accuracy. If the flow field predicted by the pseudocompressible equations (3) and (4) do not satisfy the incompressible Navier-Stokes equations (1) and (2) within the desired tolerance, the equations must be updated once more. Returning to block 101, we set up the equations and matrix for all internal nodes and boundary nodes. This time the artificial multiblock boundary node C in block 101 can effectively be solved using the same procedure used for node B in the first update for block 102. Node C in block 102 is completely surrounded by other nodes and therefore was correctly updated according to the pseudocompressibility equations during the iteration in that block. We take the difference in the values of pressures and velocities between Node C's current value in block 101 and its newly predicted value in block 102 and incorporate this difference value directly into the matrix structure describing the coupling between all the nodes in block 101. This, again, makes node C appear as though it was solved as an internal node with nodes completely surrounding it. After updating all the nodes with their new values, node C in block 101 will now have the same values of pressure and velocity as node C in block 102. All other artificial multiblock boundary nodes in block 101 are treated in this same fashion.

4) For block 102, during the second iteration the procedure is exactly the same as described in 2). Physical boundary nodes and internal boundary nodes are updated using the physical boundary conditions and psuedocompressibility equations, respectively. All artificial multiblock boundary nodes, like node B in block 102, are updated using the difference between their current value in block 102 and the previously new predicted value in block 101. This change in their value is incorporated in the matrix assembly of all the equations and boundary conditions at all nodes in block 102.

5) Once again the predicted flow field accuracy is checked using equations (1) and (2). If the tolerance is still not satisfied, the procedure is again repeated using steps 3) and 4). This process continues in iterative fashion until the desired tolerance between the predictions using the psuedocompressibility equations (3) and (4) and the Navier-Stokes equations (1) and (2) is achieved. This may take several hundred to several thousand iterations, depending on the number of multiblocks used, the geometric complexity of the flow field, and the closeness of the initial guess to the final solution.

The change in multi-block nodal values are entered in the matrix structure thereby creating an implicit scheme, i.e., all nodes within a particular block know about the update for the adjoining multiblock nodes. This creates a faster converging scheme than simply changing the multiblock nodal values and holding them constant during the solution process within that block. However, note that the multi-block nodes will still essentially lag other nodal values within that block by one iteration. This results from the fact that nodal values and block boundaries satisfy the governing equations only in the block for which these nodes were internal nodes. Within the block that these nodes were actually boundary nodes, their pressure/velocity values are updated only according to the solved equations in a previous block.

The advantages of the present invention are numerous. By linking the multiblock structure via overlapping blocks, the prediction of steady, incompressible fluid flow over a complex, large-scale geometry is achieved more quickly than previous multiblock methods. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a multiblock system for iteratively processing the pseudocompressibility equations as a prediction of steady, incompressible fluid flow over a given geometry, a method of coupling solutions to the pseudocompressibility equations between blocks of the multiblock system comprising the steps of:

creating an overlapping multiblock grid model of the given geometry, each block being defined by boundary nodes and containing interior nodes wherein boundary nodes from one block overlap to interior nodes of an adjoining block;

updating, at each iteration, boundary nodes from the one block overlapping to interior nodes of the adjoining block, wherein updated boundary nodes for the one block are equal to a difference between corresponding boundary nodes for the one block and overlapped interior nodes of the adjoining block; and processing, utilizing the pseudocompressibility equations, both boundary and interior nodes of each block according to a central finite differencing method wherein equation solutions at updated boundary nodes of the one block overlapping to interior nodes of the adjoining block use boundary and interior nodes of the adjoining block, whereby the equation solutions at updated boundary nodes are coupled between the one block and the adjoining block.

2. A method according to claim 1 further including the step of initializing each boundary node and interior node to a respective boundary and interior initial node values to be used by the pseudocompressibility equations during a first iteration.

3. A method according to claim 1 further including the step of storing each difference in a matrix used to describe a relationship between the boundary and interior nodes of each block wherein said difference describes a relationship between overlapping blocks.

* * * * *